United States Patent
Taniguchi et al.

(10) Patent No.: US 6,192,183 B1
(45) Date of Patent: Feb. 20, 2001

(54) VIDEO EDITING SCHEME USING ICONS DIRECTLY OBTAINED FROM CODED VIDEO DATA

(75) Inventors: Yukinobu Taniguchi; Hiroshi Hamada; Yasuhiro Niikura; Yoshinobu Tonomura, all of Kanagawa (JP)

(73) Assignee: Nippon Telegraph and Telephone Corporation, Tokyo (JP)

( * ) Notice: Under 35 U.S.C. 154(b), the term of this patent shall be extended for 0 days.

(21) Appl. No.: 08/866,341

(22) Filed: May 30, 1997

(30) Foreign Application Priority Data

May 30, 1996 (JP) .................................................. 8-135625

(51) Int. Cl.⁷ ...................................................... H04N 5/76
(52) U.S. Cl. .............................. 386/52; 386/111; 345/328
(58) Field of Search ................... 386/4, 52, 45, 386/64, 69–70, 125–126, 26, 38, 95, 111–112; 345/328; 348/699–700

(56) References Cited

U.S. PATENT DOCUMENTS

| | | | |
|---|---|---|---|
| 5,237,648 | * 8/1993 | Mills et al. | ........................... 395/133 |
| 5,333,062 | 7/1994 | Naeda . | |
| 5,537,530 | 7/1996 | Edgar et al. . | |
| 5,870,754 | * 2/1999 | Dimitrova et al. | ................... 707/104 |
| 5,982,979 | * 11/1999 | Omata et al. | ........................... 386/69 |

FOREIGN PATENT DOCUMENTS

| | | |
|---|---|---|
| 0564 247 A1 | 10/1993 | (EP) . |
| 0590759A1 | 4/1994 | (EP) . |
| 0607010A1 | 7/1994 | (EP) . |
| 06309381 | 11/1994 | (EP) . |
| 93-183862 | 7/1993 | (JP) . |
| 94-022304 | 2/1994 | (JP) . |
| 95-220050 | 8/1995 | (JP) . |
| WO9411995 | 5/1994 | (WO) . |
| WO9422108 | 9/1994 | (WO) . |
| WO9612240 | 4/1996 | (WO) . |

OTHER PUBLICATIONS

"Intelligent Rough Video Editing System," Tanaka et al., *Hitachi Review*, vol. 44, No. 3, (1995).

"Video Parsing and Browsing Using Compressed Data," Zhang, et al., *Multimedia Tools and Applications*, pp. 89–111 (1995).

"Scene Change Detecting in a MPEG Compressed Video Sequence," Meng, et al., *SPIE*, vol. 2419, p. 14.

Journal of Visual Jan. 1990; Yoshinobu Tonomura.*

Digital on demand Aug. 1993, Little, Folz, Reeve.*

RealPlayer Plus.*

* cited by examiner

*Primary Examiner*—Thai Tran
(74) *Attorney, Agent, or Firm*—Banner & Witcoff, Ltd.

(57) ABSTRACT

A video editing scheme for enabling a video editing operation on the coded video data efficiently. In a system in which the coded video data are decoded and displayed on a video display device, events including scene changes are detected from the coded video data, and icons are produced from the coded video data in correspondence to the detected events. On the other hand, playback possible positions from which the coded video data can be playbacked smoothly are determined, and an index information including an information on the produced icons and the determined playback possible positions is managed. Then, a plurality of icons are displayed on a single display, and a user is allowed to specify a desired icon among the displayed icons on the single display. Then, one playback possible position corresponding to the desired icon specified by the user is obtained according to the managed index information, and the coded video data are supplied to the video display device starting from the obtained playback possible position.

21 Claims, 9 Drawing Sheets

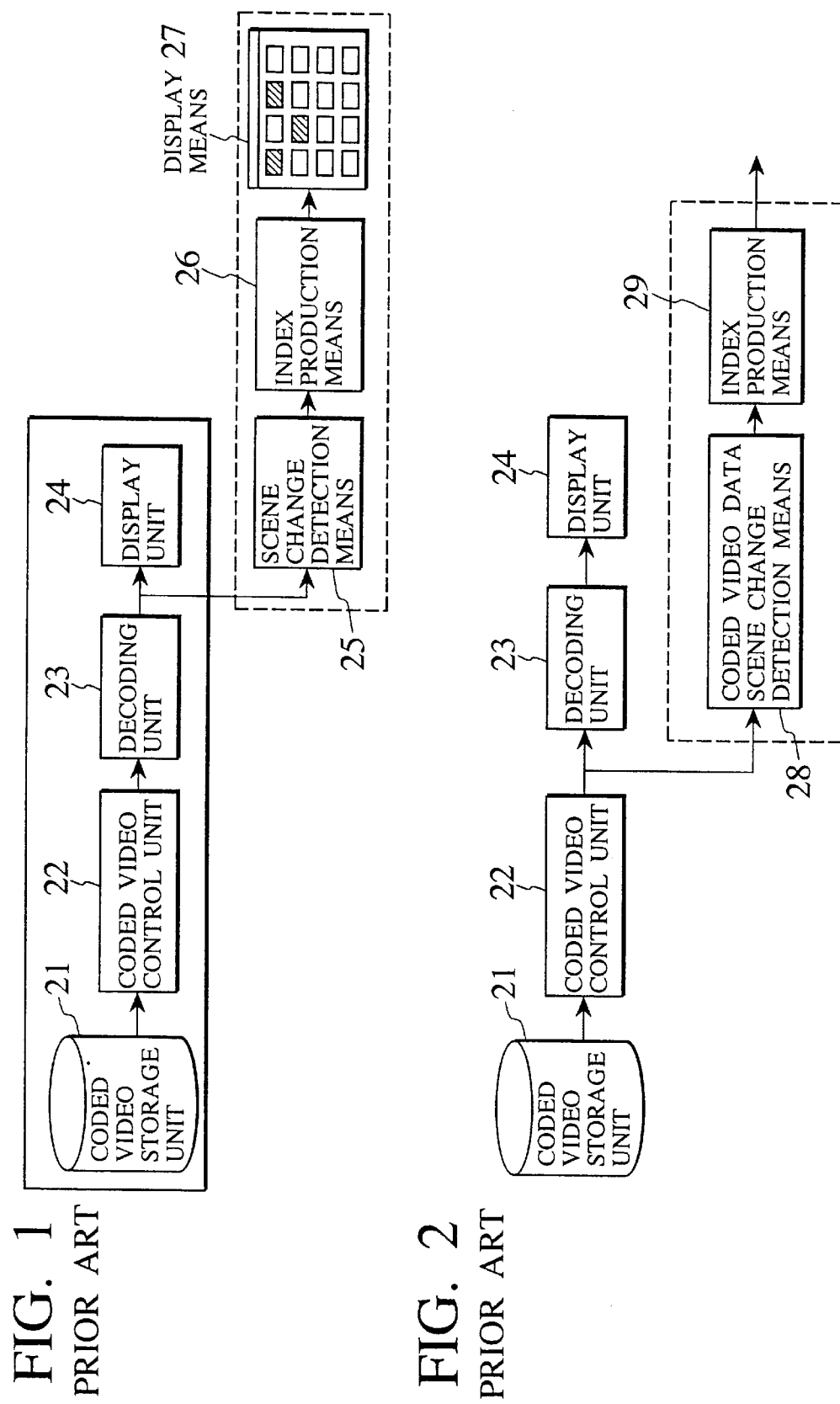

TIME

| EVENT ID | EVENT TYPE | EVENT TIME | PLAYBACK POSSIBLE POSITION | COMMENT | POINTER TO ICON |
|---|---|---|---|---|---|
| 0 | 0 | 00:00:00 | 210 | TITLE | • |
| 1 | 0 | 00:01:10 | 3056 | | • |
| 2 | 1 | 00:03:00 | 10214 | NEWS-CASTER | |
| 3 | 0 | 00:03:10 | 15222 | | |
| 4 | 0 | 00:05:00 | 20001 | | |
| 5 | 0 | 00:05:35 | 25023 | | |
| 6 | 1 | 00:05:50 | 30188 | | |

| TIME | PLAYBACK POSSIBLE POSITION |
|---|---|
| 00:00:00 | 210 |
| 00:00:15 | 910 |
| 00:01:00 | 3056 |
| 00:01:15 | 5002 |
| 00:02:00 | 8901 |
| 00:02:15 | 13055 |
| 00:03:00 | 16132 |

TABLE - 2

| EVENT ID | EVENT TYPE | EVENT TIME | POINTER TO ICON |
|---|---|---|---|
| 0 | 0 | 00:00:00 | |
| 1 | 2 | 00:01:10 | |
| 2 | 1 | 00:03:00 | |
| 3 | 0 | 00:03:10 | |
| 4 | 1 | 00:05:00 | |
| 5 | 0 | 00:05:35 | |

TABLE - 1

VIDEO EDITING SCHEME USING ICONS DIRECTLY OBTAINED FROM CODED VIDEO DATA

BACKGROUND OF THE INVENTION

1. Field of the Invention

The present invention relates to a video editing scheme to be used in playbacking and editing coded video data.

2. Description of the Background Art

In conjunction with the standardization of the video coding scheme such as MPEG, a use of the coded video has been widening, and there is a demand for an editing apparatus which is capable of retrieving a desired scene from the video quickly, processing the coded video in a coded form efficiently, and changing a playback order of the video.

Conventionally, in order to retrieve a desired scene from the non-coded video such as video images, it has been necessary to repeatedly execute operations such as rewinding and fast forwarding operations, so that there has been a problem that a considerable amount of time is required for the scene retrieval. In view of this problem, there has been a proposition of a video editing apparatus as disclosed in Japanese Patent Application Laid Open No. 5-183862 (1993), which has a detection means for detecting images at which the scene is changed in the video, and an index information production means for producing a video index information in terms of icons obtained by reducing the images detected by the detection means. This video editing apparatus has already been developed for practical use. According to this proposition, the icons representing the scene changed images detected from the video are displayed in a form of multiple image field display, so that an outline of the video content can be comprehended without watching the video in a time order, and therefore it becomes possible to realize the scene retrieval efficiently.

This conventional video editing apparatus is designed to handle the non-coded video such as video images, and when this conventional video editing apparatus is directly applied to handle the coded video, the following problems arise.

FIG. 1 shows one exemplary apparatus configuration in which the above described conventional video editing apparatus is directly applied to the coded video.

In FIG. 1, a portion enclosed by a solid line represents a general configuration of a conventional apparatus for playbacking the coded video in which a coded video control unit 22 reads out the coded video data stored in a coded video storage unit 21 and supply the coded video data to a decoding unit 23 which decodes the coded video data. The decoded video data are then supplied to and displayed at a display unit 24. Here, the decoding unit 23 is usually implemented in a form of dedicated hardware.

Also, in FIG. 1, a portion enclosed by a dashed line represents the above described conventional video editing apparatus in which a scene change detection means 25 detects images at which the scene is changed in the video, an index production means 26 produces a video index information in terms of icons obtained by reducing the images detected by the scene change detection means 25, and a display means 27 displays these icons in a form of multiple image field display.

FIG. 1 shows one exemplary configuration for realizing the above described conventional video editing apparatus in combination with an apparatus for playbacking the coded video, in which the decoded video data are taken from the decoding unit 23 of the playback apparatus and entered into the above described conventional video editing apparatus.

However, the decoding unit 23 is usually implemented in a form of dedicated hardware as already mentioned above, so that it is not easy to read out and process the decoded video data by means of software. Even if it is possible, there still remains a problem that an amount of data for the decoded video data is very large so that the data transfer (such as a data transfer using an internal bus of a computer) requires a considerable amount of time.

FIG. 2 shows another exemplary apparatus configuration in which the above described conventional video editing apparatus is directly applied to the coded video.

In FIG. 2, the scene change detection means is provided in a form of coded video data scene change detection means 28 which can detect a scene change directly from the coded video data. Such a coded video data scheme change detection means can be realized by using the known configuration as disclosed in Japanese Patent Application No. 6-22304 (1994). Then, the coded video control unit 22 reads out the coded video data stored in the coded video storage unit 21 and supply the coded video data directly to the coded video data scene change detection means 28 (before supplying the coded video data to the decoding unit 23), so that an index production means 29 produces the index information according to the scene changes detected by the coded video data scene change detection means 28.

This configuration of FIG. 2 has a problem in that the index production means 29 is required to carry out the decoding processing in order to produce the icons in forms of the reduced images, so that a considerable amount of time is required for the index production processing.

In addition, there is another conventionally encountered problem that it is not easy to edit the coded video. This problem stems from the fact that it is not easy to segment the coded video data at arbitrary positions and change an order of segments. Because of this problem, it has conventionally been customary to carry out the editing on an original tape and then the edited video is coded, so as not to require the editing on the coded video, This problem regarding a difficulty of editing the coded video will now be described in further detail for an exemplary case of using the MPEG coding scheme.

In the MPEG coding scheme, the image sequence is coded by using a combination of an intra-field coded picture (I picture) in which the image is compressed by removing the redundancy within each image field, an inter-field forward direction predictively coded picture (P picture) which utilizes a correlation between an image of interest and a past image, and an inter-field bidirectional predictively coded picture (B picture) which utilizes a correlation among an image of interest, a past image, and a future image, as shown in FIG. 3. In FIG. 3, a picture 31 is an I picture which is coded within an image field, so that it is possible to reproduce an image from the data of this picture 31 alone. On the other hand, a picture 32 is a B picture from which an image cannot be reproduced until its past picture 31 and its future picture 33 are decoded. Consequently, in the MPEG coded video, it is only possible to segment the video at a position of the I picture. If the video is segmented at a position of the B picture 32, for instance, it would become impossible to decode the B picture 32 because data of the I picture 31 would become unavailable.

In other words, in order to segment the video at a portion other than that of the I picture, it would be necessary to reconstruct the coded data by repeatedly executing the decoding processing and the coding processing, and because of that, there has been problems that it would require a considerable amount of time and an image quality would be degraded.

For the same reason, in the MPEG, a position from which the video playback can be started is limited to a position of the I picture (or a top of a packet containing the sequence header that stores parameters necessary for the decoding, strictly speaking). The above described conventional video editing apparatus does not account for this limitation at all, so that when the above described conventional video editing apparatus is directly used to handle the coded video, there is a problem that the decoding unit would not operate properly at a time of the video playback, that is, the playbacked images would be temporarily disturbed until the I picture is displayed. In addition, Japanese Patent Application Laid Open No. 5-183862 mentioned above does not have any teaching directed to a specific editing operation such as a change of playback orders.

Thus because of the lack of considerations for these problems which are specific to the coded video, the prior art has been associated with a problem that a considerable amount of time is required for the production of icons because it is necessary to carry out the decoding processing at a time of producing icons, as well as a problem that the video cannot be playbacked smoothly because the video decoding unit does not operate properly at a time of the video playback.

SUMMARY OF THE INVENTION

It is therefore an object of the present invention to provide a video editing scheme which is capable of detecting a scene change from the coded video data directly, producing icons directly from the coded video data, and displaying the produced icons, so that it become possible to comprehend an outline of the video content efficiently, and it becomes possible to carry out an editing operation such as a change of playback orders in scene units on the coded video data efficiently.

According to one aspect of the present invention there is provided a video editing apparatus, comprising: a video display unit for decoding and displaying coded video data; an event detection unit for detecting events including scene changes, from the coded video data; an icon production unit for producing icons from the coded video data in correspondence to the events detected by the event detection unit; a playback possible position detection unit for determining playback possible positions from which the coded video data can be playbacked smoothly; an index information management unit for managing an index information including an information on the icons produced by the icon production unit and the playback possible positions determined by the playback possible position detection unit; a display input unit functioning as a user interface for displaying a plurality of icons produced by the icon production unit on a single display, and allowing a user to specify a desired icon among said plurality of icons on the single display; and a control unit for obtaining one playback possible position corresponding to the desired icon specified by the user at the display input unit according to the index information managed by the index information management unit, and supplying the coded video data to the video display unit starting from said one playback possible position.

According to another aspect of the present invention there is provided a video editing method, comprising the steps of: (a) decoding and displaying coded video data on a video display device; (b) detecting events including scene changes, from the coded video data; (c) producing icons from the coded video data in correspondence to the events detected by the step (b); (d) determining playback possible positions from which the coded video data can be playbacked smoothly; (e) managing an index information including an information on the icons produced by the step (c) and the playback possible positions determined by the step (d); (f) displaying a plurality of icons produced by the step (c) on a single display, and allowing a user to specify a desired icon among said plurality of icons on the single display; and (g) obtaining one playback possible position corresponding to the desired icon specified by the user at the step (f) according to the index information managed by the step (e), and supplying the coded video data to the video display device starting from said one playback possible position.

According to another aspect of the present invention there is provided an article of manufacture, comprising: a computer usable medium having computer readable program code means embodied therein for causing a computer to function as a video editing system in which coded video data are decoded and displayed by a video display device, the computer readable program means including: first computer readable program code means for causing the computer to function as an event detection unit for detecting events including scene changes, from the coded video data; second computer readable program code means for causing the computer to function as an icon production unit for producing icons from the coded video data in correspondence to the events detected by the first computer readable program code means; third computer readable program code means for causing the computer to function as a playback possible position detection unit for determining playback possible positions from which the coded video data can be playbacked smoothly; fourth computer readable program code means for causing the computer to function as an index information management unit for managing an index information including an information on the icons produced by the second computer readable program code means and the playback possible positions determined by the third computer readable program code means; fifth computer readable program code means for causing the computer to function as a user interface for displaying a plurality of icons produced by the second computer readable program code means on a single display, and allowing a user to specify a desired icon among said plurality of icons on the single display; and sixth computer readable program code means for causing the computer to function as a control unit for obtaining one playback possible position corresponding to the desired icon specified by the user at the user interface according to the index information managed by the fourth computer readable program code means, and supplying the coded video data to the video display device starting from said one playback possible position.

Other features and advantages of the present invention will become apparent from the following description taken in conjunction with the accompanying drawings.

BRIEF DESCRIPTION OF THE DRAWINGS

FIG. 1 is a block diagram showing one exemplary configuration of a coded video editing apparatus based on a conventional non-coded video editing apparatus.

FIG. 2 is a block diagram showing another exemplary configuration of a coded video editing apparatus based on a conventional non-coded video editing apparatus.

DETAILED DESCRIPTION OF THE PREFERRED EMBODIMENTS

Referring now to FIG. 4 to FIG. 8, the first embodiment of a video editing scheme according to the present invention will be described in detail.

Figure 3:
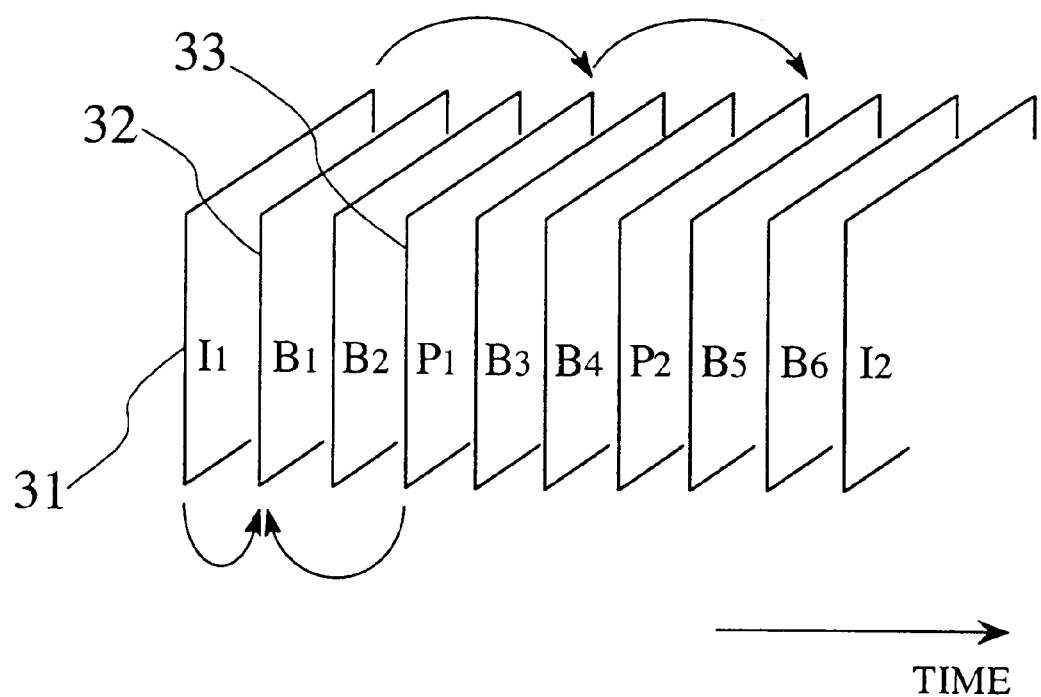
FIG. 3 is a diagram for explaining the MPEG coding scheme.
Figure 4:
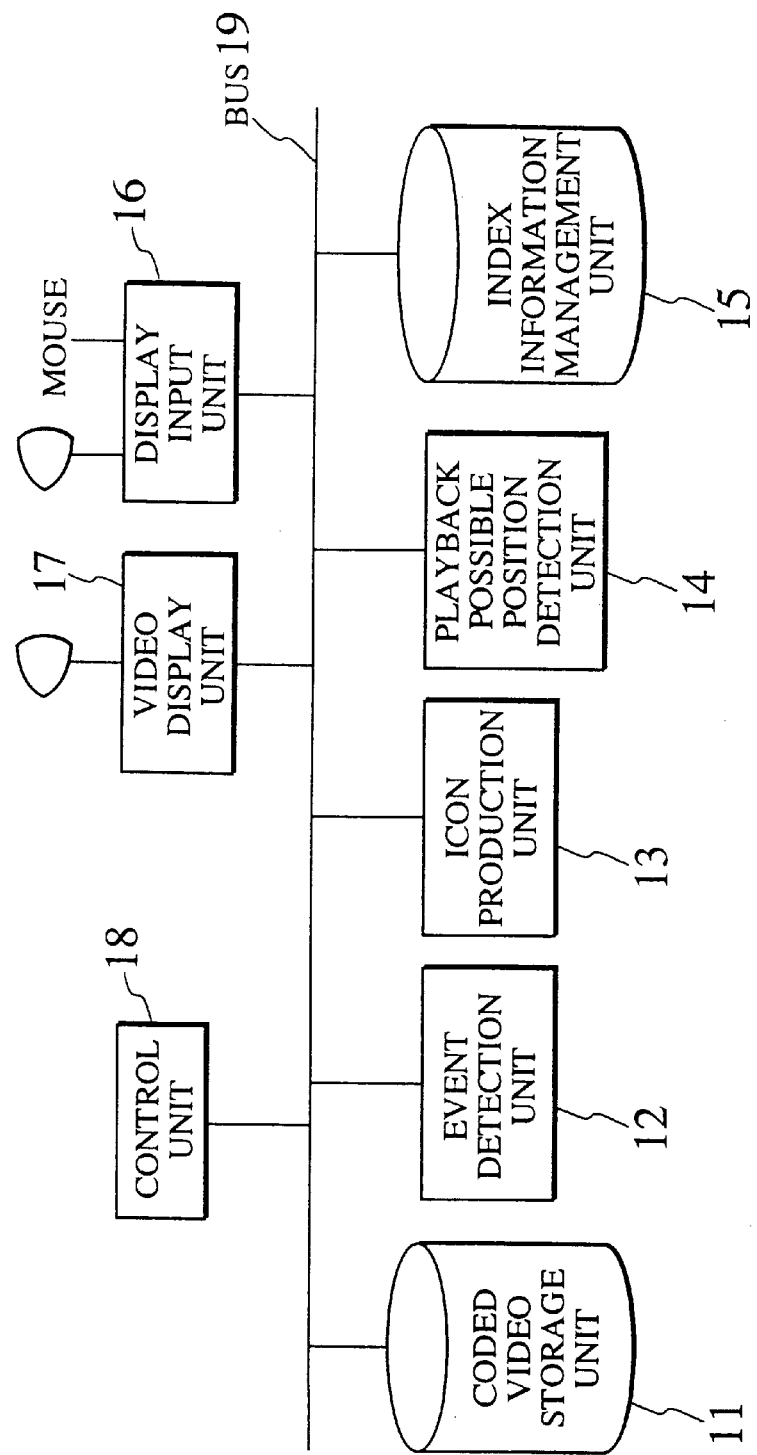
FIG. 4 is a block diagram showing an exemplary configuration of a video editing apparatus in the first embodiment of the present invention.

FIG. 4 shows an exemplary configuration of a video editing apparatus in this first embodiment, which comprises a coded video storage unit 11, an event detection unit 12, an icon production unit 13, a playback possible position detection unit 14, an index information management unit 15, a display input unit 16, a video display unit 17, and a control unit 18, all of which are connected through a bus 19. The control unit 18 controls an overall operation of this video editing apparatus.

The coded video storage unit 11 stores the coded video data, and formed by a magnetic disk device or a magneto-optic disk device. In this first embodiment, the coded video data are assumed to be the MPEG coded video data.

The event detection unit 12 detects a scene change as an event from the coded video data. Here, the detection of the scene change from the coded video data can be realized by using a method disclosed in Japanese Patent Application No. 6-22304 (1994), for example. This is a method for automatically detecting the scene change based on the thresholding of various feature values calculated at a time of the video coding/decoding, such as an accumulated prediction error in each frame, an amount of data for the coded video data, a number of pixels which are intra-frame coded (or inter-frame coded). Besides this detection of a scheme change, it is also preferable to detect various other events such as a dissolve (which is a special effect in which the scene changes while two scenes appear to be dissolved one another), an appearance of a person, a start of a speech, an appearance of a caption, etc., from a viewpoint of constructing the convenient video editing interface that can reflect the video content well.

Figure 5:
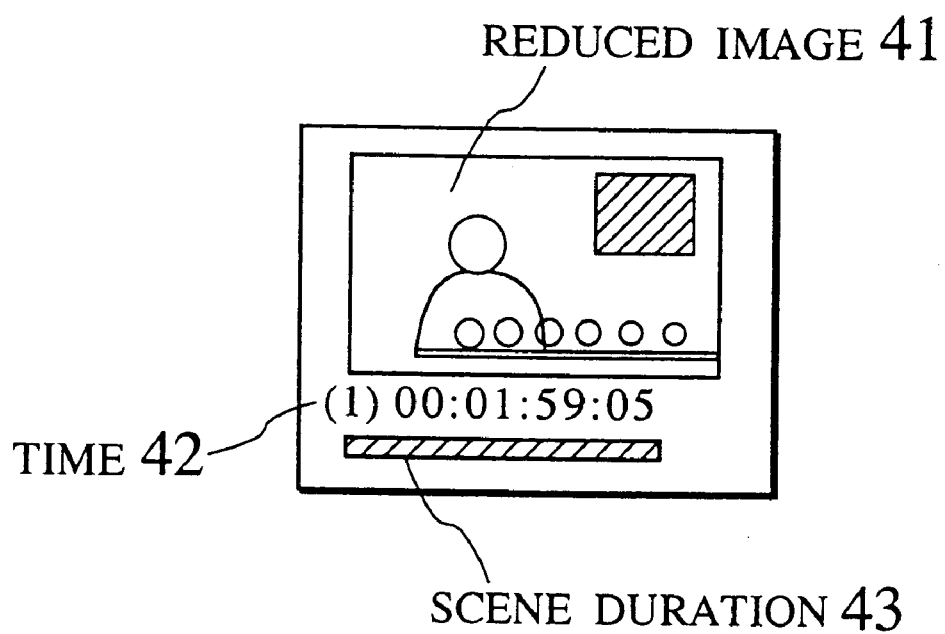
FIG. 5 is a diagram showing an exemplary form of an icon produced by an icon production unit in the apparatus of FIG. 4.

The icon production unit 13 produces icons which are image information for concisely representing the scene contents in correspondence to the detected event. An exemplary form of an icon produced by the icon production unit 13 is shown in FIG. 5. This icon of FIG. 5 is formed by a reduced image area 41 in which the image corresponding to the event is shown in a form of reduced image, a time area 42 in which an event occurrence time is shown in a form of text information, and a scene duration area 43 in which a time interval between the current event and a next event is visually indicated. By visually expressing an information related to the event as an icon in this manner, it becomes possible to carry out the video operation intuitively.

Next, a procedure for producing the reduced image from the MPEG coded video data will be described.

Figure 6:
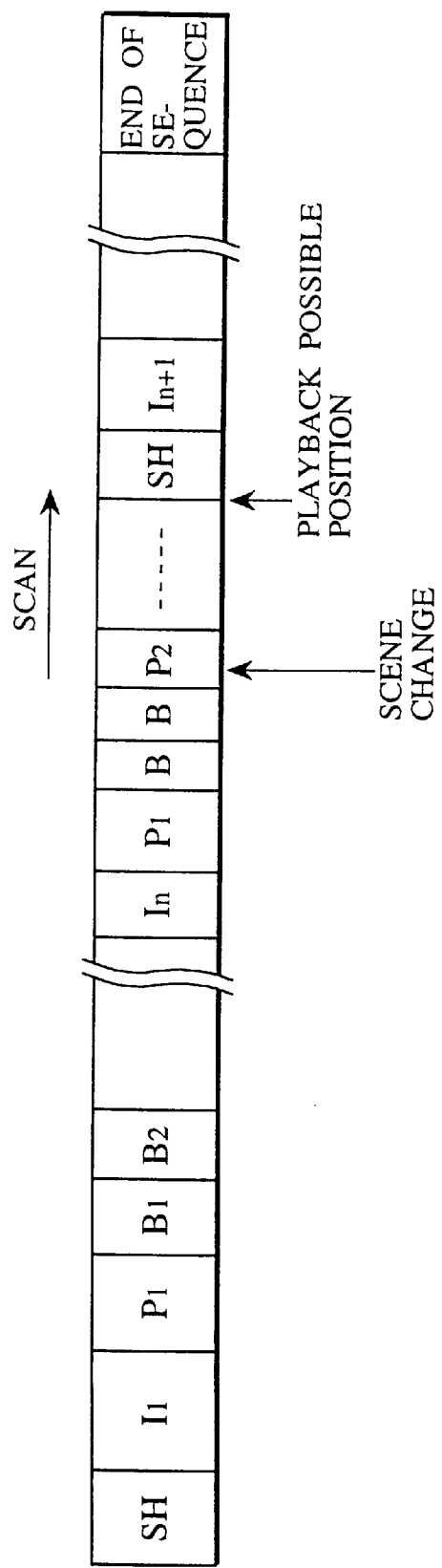
FIG. 6 is a diagram showing a data structure of the MPEG coded video data for explaining the processing in the apparatus of FIG. 4.

FIG. 6 shows a data structure of the MPEG coded video data, where $I_i$ (i=1, 2, . . . ) indicates an I picture, $P_i$ (i=1, 2, . . . ) indicates a P picture, and SH indicates a control data called sequence header which is used in the decoding. Now, suppose that an event (a scene change) occurred at a position of $P_2$ as indicated in FIG. 6. Here, the production of the reduced image from data of $P_2$ requires some processing time because there is a need to carry out the decoding processing by referring to past data. In order to avoid this time consuming decoding processing, the icon production unit 13 scans the video data to find out a next I picture $I_{n+1}$, and extracts only the DC component of the DCT (Discrete Cosine Transform) coefficient from data of this I picture $I_{n+1}$. Here, the DC component of the DCT coefficient in the I picture indicates average values of a color difference component and an intensity for each 8×8 pixel block, so that it is possible to obtain the reduced image in ⅛ longitudinal and transversal sizes without requiring the time consuming decoding processing. This procedure is based on an assumption that the image content does not change very much between $P_2$ and $I_{n+1}$, but this is a reasonable assumption in most cases because the I picture is usually inserted at a rate of one I picture in every 0.5 second or so.

Note that, in producing the reduced image, from a viewpoint of improving the visibility of the icon, it is preferable to produce the icon from the I picture which has the least blurring due to motion within the scene, and it is also preferable to detect a dissolve so as not to produce the icon from the picture at which two images are overlapping. In addition, it is also possible to produce the reduced image in higher resolution by using a part of the AC component of the DCT coefficient in addition to the DC component of the DCT coefficient.

Also, it is preferable to provide an interface which can present nearby I picture reduced images of the automatically produced icon to the user and allow the user to select an appropriate one upon receiving the user's judgement of the automatically produced icon as inappropriate. To this end, in addition to produce the reduced image every time the event is detected, it is also possible to produce the reduced images for all the I pictures in advance.

The playback possible position detection unit 14 determines a position in the video from which the video data is to be decoded in order to playback the video from a position corresponding to the event. For instance, when an event is detected at a position of $P_2$ in FIG. 6, if the video data starting from a position of $P_2$ is sent to the video display unit 17, there would be a problem that the displayed images are temporarily disturbed because the video display unit 17 cannot properly decode the images of $P_2$, $P_3$, etc. For this reason, the playback possible position detection unit 14 selects a position of a next sequence header (SH) as the playback possible position.

Here, in a case where the sequence headers appear in the bit stream only sparsely, it is also possible to extract the sequence header information in advance (as a control data used in the second embodiment to be described below), and send the sequence header information to the video display unit 17 according to the need.

Note that the above description is for an exemplary case of using MPEG/VIDEO bit stream, but in a case of using MPEG/SYSTEM bit stream, it is also possible to select a top of a packet in which the I picture is contained as the playback possible position. Moreover, depending on the event type, it is also possible to select a position near a prescribed period of time before or after an event as the playback possible position. Furthermore, it is also possible to identify a speech existing section (a non-silent section) which contains the event by analyzing the speech data, and select a position of a sequence header which appears immediately before the speech existing section so as not to interrupt the speech.

Figures 7, 8:
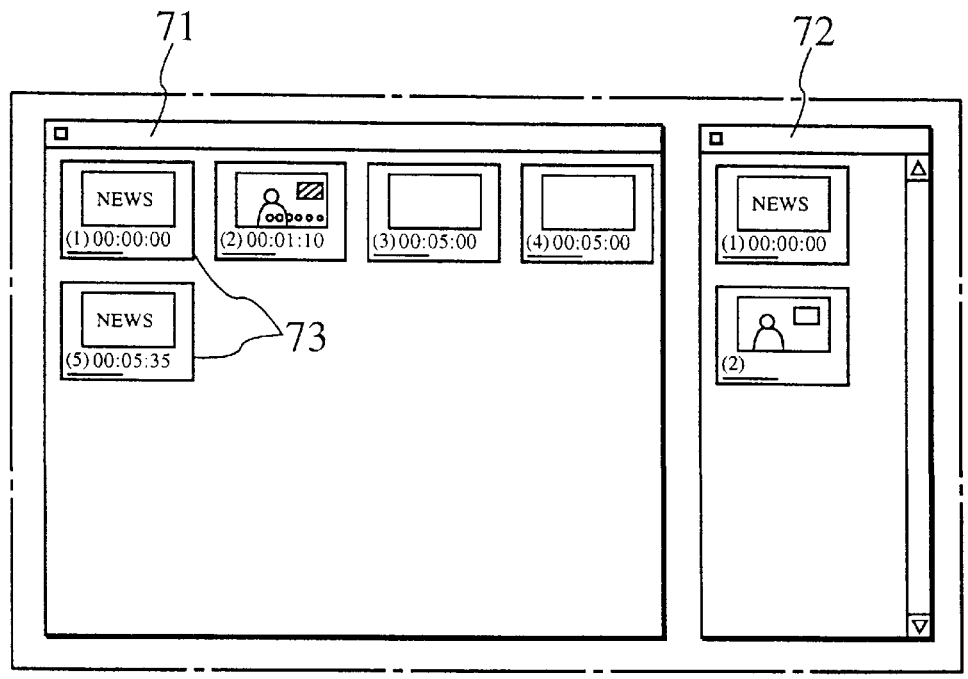
FIG. 7 is a diagram showing a data structure of an index management table used by an index information management unit in the apparatus of FIG. 4.
FIG. 8 is a diagram showing an exemplary computer screen display by a display input unit in the apparatus of FIG. 4.

The index information management unit 15 manages an index information which contains the icons produced by the icon production unit 13 and the playback possible position information obtained by the playback possible position detection unit 14. For example, the index information is managed in a form of a data structure (an index management table) as shown in FIG. 7, which is provided inside a computer memory. This index management table of FIG. 7 has an event ID field 61, an event type field 62, an event time field 63, a playback possible position field 64, a comment field 65, and a pointer to icon field 66. In the event type field 62, "0" indicates a scene change while "1" indicates any other event. FIG. 7 also shows a pointer list 67 which will be described in detail below.

The display input unit 16 is realized in forms of a computer screen and a mouse in this first embodiment. FIG. 8 shows an exemplary computer screen display for the display input unit 16. In FIG. 8, the icons corresponding to the specified event (such as an event of an event type="0") are composed and displayed in a window 71 on the computer screen, according to the index management table of FIG. 7. By watching this computer screen display, it is possible to glance over various scenes contained in the video, so that it becomes possible to comprehend the outline of the video content without repeatedly executing the rewinding operation and the fast forwarding operation. In addition, by pointing the icons on the computer screen display using the mouse, it is possible to carry out various operations such as a change of a display/non-display status of the video, a change of an arrangement order of the icons, and a production of a list of the icons in a modified arrangement order at another window 72. Here, the arrangement order information is stored as the pointer list 67 of FIG. 7 in the index information management unit 15. The pointer list 67 shown in FIG. 7 indicates that the video is to be playbacked in an order of the event IDs "0", "1", "4", "5", "4", "5", and "6".

When the user commands the playback of the video by specifying an icon, the control unit 18 searches the playback possible position corresponding to the specified icon from the index management table of FIG. 7, reads out the corresponding video data by supplying the playback possible position to the coded video storage unit 11, and supplies the read out video data to the video display unit 17. The video display unit 17 then decodes and displays the supplied video data. Here, the index information management unit 15 manages the playback possible position in the index management table so that it is possible to make a random access without requiring an analysis of the MPEG data from the top.

Also, when the user commands the playback of the video according to the icon list in a modified arrangement order, the control unit 18 reads out the coded video data from appropriate positions by sequentially obtaining the playback possible positions from the pointer list 67 of the index management table, and supplies the read out video data to the video display unit 17 so as to realize the commanded playback of the video according to the icon list in a modified arrangement order.

Figure 9:
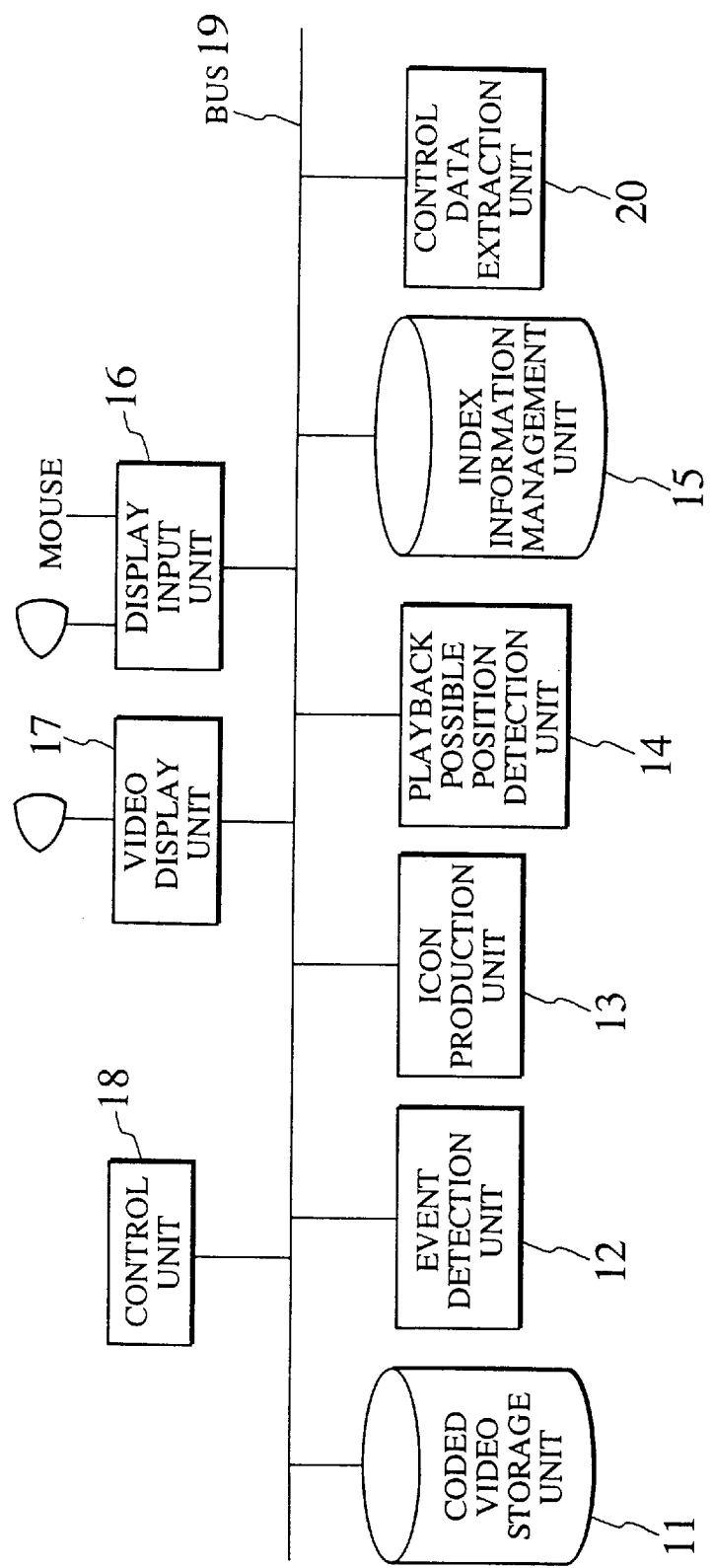
FIG. 9 is a block diagram showing an exemplary configuration of a video editing apparatus in the second embodiment of the present invention.

Referring now to FIG. 9, the second embodiment of a video editing scheme according to the present invention will be described in detail.

FIG. 9 shows an exemplary configuration of a video editing apparatus in this second embodiment, which differs from the apparatus of FIG. 4 in that a control data extraction unit 20 is additionally connected to the bus 19. The rest of this configuration of FIG. 9 is substantially the same as that of FIG. 4.

In this configuration of FIG. 9, the control data extraction unit 20 extracts the control data necessary in playbacking the coded video data, from the coded video. The extracted control data is subsequently supplied to the video display unit 17 by the control unit 18 before the coded video data is supplied.

In other words, in this second embodiment, the control data necessary in playbacking the coded video data is extracted in advance by the control data extraction unit 20, and the control unit 18 supplies the control data to the video display unit 18 before supplying the coded video data at a time of the video playback, so that the video display unit 17 can decode the coded video data properly even when the control data necessary in decoding the coded video data is provided only at a top of the coded video data while a random access or the playback in a modified playback order is to be carried out.

Figure 10:
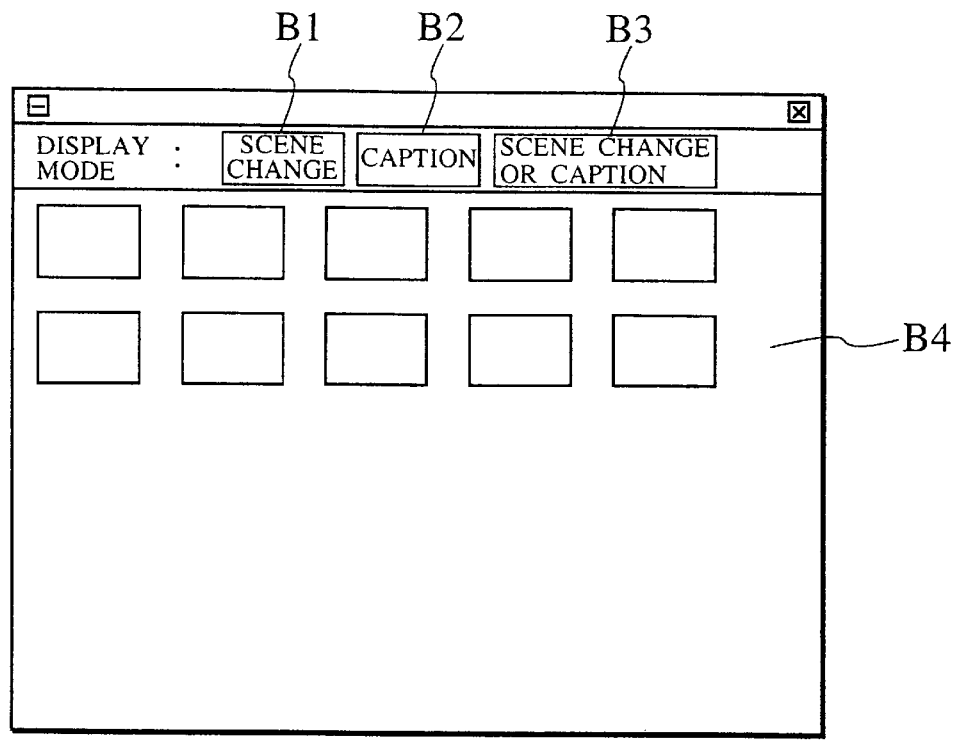
FIG. 10 is a diagram showing an exemplary computer screen display by a display input unit in the third embodiment of the present invention.
Figure 11:
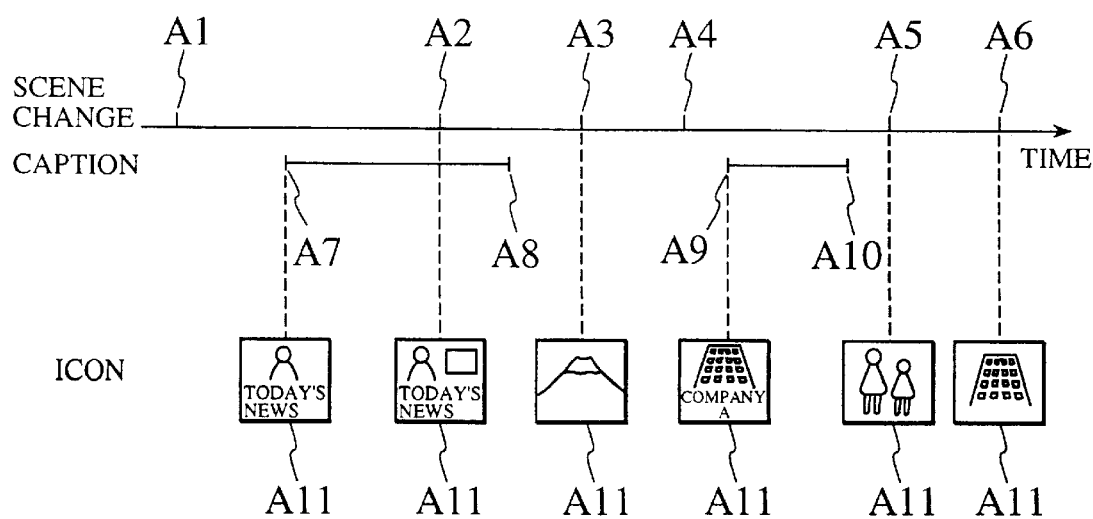
FIG. 11 is a diagram showing an exemplary sequence of events and icons for explaining a display mode used in the third embodiment of the present invention.

Referring now to FIG. 10 and FIG. 11, the third embodiment of a video editing scheme according to the present invention will be described in detail.

In the first embodiment described above, the scene change is detected as an event and an image near the top of the scene is displayed as an icon image. However, in a case of news video, a caption contained in the video is important in a sense that a caption can indicate the news content precisely. For this reason, it is preferable to display an image containing a caption as an icon image in a case of the news video. Note that the icon image produced upon detecting the scene change is not necessarily an image containing a caption. Consequently, in this third embodiment, the user is allowed to select an image to be displayed as an icon image by switching the display mode according to the video content or a purpose of the video use.

FIG. 10 shows an exemplary computer screen display in this third embodiment, where the display mode can be switched by means of three display mode selection buttons B1, B2 and B3.

When the first display mode selection button B1 is selected, the icons corresponding to the scene changes are displayed in a display region B4, similarly as in the first embodiment described above.

When the second display mode selection button B2 is selected, only those icons which satisfy the condition that the event type is a caption are extracted, and displayed in the display region B4. When the icon list display showing all the icons corresponding to the scene changes has too many icons, it is possible to produce a compact icon list by displaying only those icons which are corresponding to the captions.

When the third display mode selection button B3 is selected, the icons are selectively displayed according to the following conditions.

(1) When a caption appears within a shot, an image at which the caption appears is set as an icon image.

(2) When the caption does not appear within a shot, an image at a top of the shot is set as an icon image.

Here, a shot is a time section between one scene change and a next scene change.

In order to realize this third display mode, the scene changes and the caption appearance/disappearance events are detected by the event detection unit 12 in advance, and the information on these events are stored in the index information management unit 15 in advance. Then, for each scene change event, the display input unit 16 checks whether the caption appeared between that scene change and the next scene change or not, and if the caption appeared, the image at which the caption appeared is selected as the icon image. If the caption did not appear, an icon is produced according to the scene change event.

This third display mode will now be described for an exemplary case shown in FIG. 11. In this example of FIG. 11, the scene change events A1 to A6, the caption appearance events A7 and A9, and the caption disappearance events A8 and A10 occur in a time order as indicated in FIG. 11. When a period between the scene change events A1 and A2 is checked, the caption appearance event A7 occurred in this period so that the caption appearance event A7 is selected rather than the scene change event A1. Next, when a period between the scene change events A2 and A3 is checked, there is no caption appearance event in this period so that the scene change event A2 is selected. When the events are sequentially selected in this manner, eventually six (that is, as many as a number of the scene change events) events A7, A2, A3, A9, A5 and A6 will be selected out of total ten events, and the icons A11 corresponding to the respective events are produced and displayed in the display region B4. Here, a number of displayed icons is the same as in a case of the first display mode, but the images containing the captions are used as the icon images so that it is possible to produce a more effective icon list for the video such as news video in which the captions are important.

As described, according to the video editing scheme of the present invention, by means of the event detection unit the icon production unit and the playback possible position detection unit as described above, it becomes possible to produce the intuitive video interface automatically at high speed.

In addition, by means of the display input unit, the video display unit and the control unit as described above, it becomes possible to carry out the editing operations on the coded video intuitively.

Moreover, by means of the control data extraction unit described above, it becomes possible to realize the random access or the playback order change efficiently even when the control data necessary in decoding the coded video data is provided only at a top of the coded video data.

It is to be noted that the above described embodiments may be modified in various aspects. For example, the above described embodiments are all directed to a case of storing the coded video data, but it is also possible to use a configuration which directly processes coded video data obtained by a video coding board. It is also possible to use a configuration in which the index management table is incorporated into the coded video data as a directory information (an information for enabling the random access).

In addition, it is also possible to carry out the keyword retrieval with respect to the text described in the comment field 65 of FIG. 7 in the index management table, and display the icons corresponding to the matched events, so as to realize an interface function for displaying the video database retrieval result.

Figures 12A, 12B:
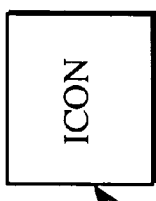
FIGS. 12A and 12B are diagrams showing two tables to be used instead of the index management table of FIG. 7 in one possible modification of a video editing scheme according to the present invention.

Moreover, it is also possible to modify the index management table of FIG. 7 into two tables as shown in FIGS. 12A and 12B. Namely, a table-1 of FIG. 12A manages a set of the event type, the event time and the pointer to icon, for each event ID, while a table-2 of FIG. 12B manages all the playback possible positions in correspondence to the corresponding times. When the icon is specified, the table-1 of FIG. 12A is referred so as to obtain the event time corresponding to the specified icon. Then, the table-2 of FIG. 12B is referred so as to find out a time which is closest to the obtained event time, and the playback possible position corresponding to the found out closest time is extracted.

This modified configuration of FIGS. 12A and 12B has the following advantage. Namely, in a case of using the index management table of FIG. 7, there is a need to detect the playback possible position again whenever the event time is corrected. In contrast, in a case of using the tables of FIGS. 12A and 12B, the table-2 of FIG. 12B records all the playback possible positions which are detected in advance, so that there is no need to detect the playback possible position again even when the event time is corrected.

It is also to be noted that a video editing apparatus based on the video editing scheme of any of the above described embodiments according to the present invention may be conveniently implemented using conventional general purpose digital computers programmed according to the teachings of the present specification, as will be apparent to those skilled in the computer art. Appropriate software coding can readily be prepared by skilled programmers based on the teachings of the present disclosure, as will be apparent to those skilled in the software art.

Such a software package can be a computer program product which employs a storage medium including stored computer code which is used to program a computer to perform the disclosed function and process of the present invention. The storage medium may include, but is not limited to, any type of conventional floppy discs, optical discs, CD-ROMs, magneto-optical discs, ROMs, RAMs, EPROMs, EEPROMs, magnetic or optical cards, or any other suitable media for storing electronic instructions.

It is also to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A video editing apparatus, comprising:

a video display unit for decoding and displaying coded video data;

an event detection unit for detecting events including scene changes, from the coded video data;

an icon production unit for producing icons from the coded video data in correspondence to the events detected by the event detection unit;

a playback possible position detection unit for determining playback possible positions from which the coded video data can be playbacked smoothly;

an index information management unit for managing an index information including an information on the icons produced by the icon production unit and the playback possible positions determined by the playback possible position detection unit;

a display input unit functioning as a user interface for displaying a plurality of icons produced by the icon production unit on a single display, and allowing a user to specify a desired icon among said plurality of icons on the single display; and a control unit for obtaining one playback possible position corresponding to the desired icon specified by the user at the display input unit according to the index information managed by the index information management unit, and supplying the coded video data to the video display unit starting from said one playback possible position.

2. The apparatus of claim 1, wherein the display input unit allows the user to specify a desired arrangement order of more than one icons on the single display, and the control unit supplies the coded video data to the video display unit according to the desired arrangement order specified by the user at the display input unit.

3. The apparatus of claim 1, wherein the icon production unit produces each icon by obtaining a reduced image from an intra-field coded image retrieved from the coded video data.

4. The apparatus of claim 3, wherein the icon production unit obtains the reduced image corresponding to each event from a first intra-field coded image which appears in the coded video data after each event.

5. The apparatus of claim 1, further comprising:

a control data extraction unit for extracting control data necessary in decoding and displaying the coded video data, from the coded video data;

wherein the control unit supplies the control data extracted by the control data extraction unit to the video display unit before supplying the coded video data.

6. The apparatus of claim 1, wherein the display input unit selects those events which satisfy a prescribed condition among the events detected by the event detection unit, and displays only those icons which are corresponding to selected events.

7. The apparatus of claim 6, wherein the prescribed condition specifies an event type of events to be selected.

8. The apparatus of claim 1, wherein the playback possible position detection unit determines a playback possible position in correspondence to each event detected by the event detection unit, and the index information management unit manages the playback possible position for each event separately.

9. The apparatus of claim 1, wherein the index information managed by the index information management unit contains an event type of each event, a playback possible position for each event, and a pointer to an icon for each event, in correspondence.

10. The apparatus of claim 1, wherein the index information management unit manages an information on an icon for each event in correspondence to an event time of each event, while separately managing the playback possible positions in correspondence to times of the playback possible positions.

11. A video editing method, comprising the steps of:
(a) decoding and displaying coded video data on a video display device;
(b) detecting events including scene changes, from the coded video data;
(c) producing icons from the coded video data in correspondence to the events detected by the step (b);
(d) determining playback possible positions from which the coded video data can be playbacked smoothly;
(e) managing an index information including an information on the icons produced by the step (c) and the playback possible positions determined by the step (d);
(f) displaying a plurality of icons produced by the step (c) on a single display, and allowing a user to specify a desired icon among said plurality of icons on the single display; and
(g) obtaining one playback possible position corresponding to the desired icon specified by the user at the step (f) according to the index information managed by the step (e), and supplying the coded video data to the video display device starting from said one playback possible position.

12. The method of claim 11, wherein the step (f) allows the user to specify a desired arrangement order of more than one icons on the single display, and the step (g) supplies the coded video data to the video display device according to the desired arrangement order specified by the user at the step (f).

13. The method of claim 11, wherein the step (c) produces each icon by obtaining a reduced image from an intra-field coded image retrieved from the coded video data.

14. The method of claim 13, wherein the step (c) obtains the reduced image corresponding to each event from a first intra-field coded image which appears in the coded video data after each event.

15. The method of claim 11, further comprising the steps of:
(h) extracting control data necessary in decoding and displaying the coded video data, from the coded video data; and
(i) supplying the control data extracted by the step (h) to the video display device before the step (g) supplies the coded video data.

16. The method of claim 11, wherein the (f) selects those events which satisfy a prescribed condition among the events detected by the step (b), and displays only those icons which are corresponding to selected events.

17. The method of claim 16, wherein the prescribed condition specifies an event type of events to be selected.

18. The method of claim 11, wherein the step (d) determines a playback possible position in correspondence to each event detected by the step (b), and the step (e) manages the playback possible position for each event separately.

19. The method of claim 11, wherein the index information managed by the step (e) contains an event type of each event, a playback possible position for each event, and a pointer to an icon for each event, in correspondence.

20. The method of claim 11, wherein the step (e) manages an information on an icon for each event in correspondence to an event time of each event, while separately managing the playback possible positions in correspondence to times of the playback possible positions.

21. An article of manufacture, comprising:
a computer usable medium having computer readable program code means embodied therein for causing a computer to function as a video editing system in which coded video data are decoded and displayed by a video display device, the computer readable program means including:
first computer readable program code means for causing the computer to function as an event detection unit for detecting events including scene changes, from the coded video data;
second computer readable program code means for causing the computer to function as an icon production unit for producing icons from the coded video data in correspondence to the events detected by the first computer readable program code means;
third computer readable program code means for causing the computer to function as a playback possible position detection unit for determining playback possible positions from which the coded video data can be playbacked smoothly;

fourth computer readable program code means for causing the computer to function as an index information management unit for managing an index information including an information on the icons produced by the second computer readable program code means and the playback possible positions determined by the third computer readable program code means;

fifth computer readable program code means for causing the computer to function as a user interface for displaying a plurality of icons produced by the second computer readable program code means on a single display, and allowing a user to specify a desired icon among said plurality of icons on the single display; and sixth computer readable program code means for causing the computer to function as a control unit for obtaining one playback possible position corresponding to the desired icon specified by the user at the user interface according to the index information managed by the fourth computer readable program code means, and supplying the coded video data to the video display device starting from said one playback possible position.

* * * * *